W. JAY.
LIQUID SUPPLY DEVICE.
APPLICATION FILED JUNE 26, 1914.
1,132,943.
Patented Mar. 23, 1915.
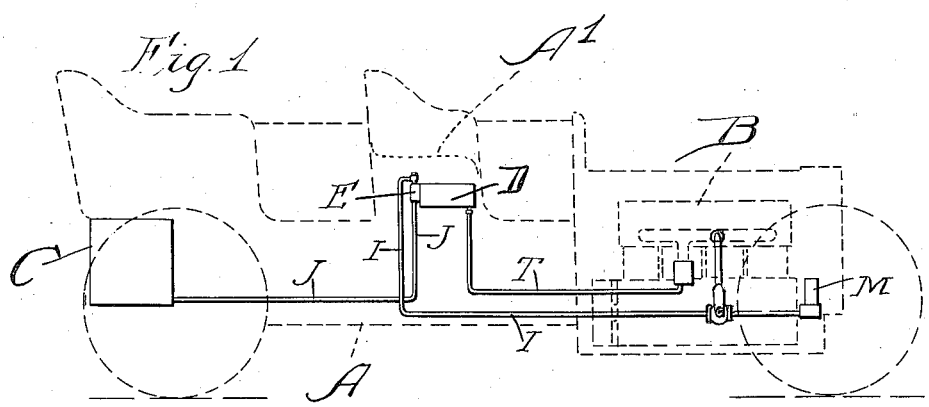
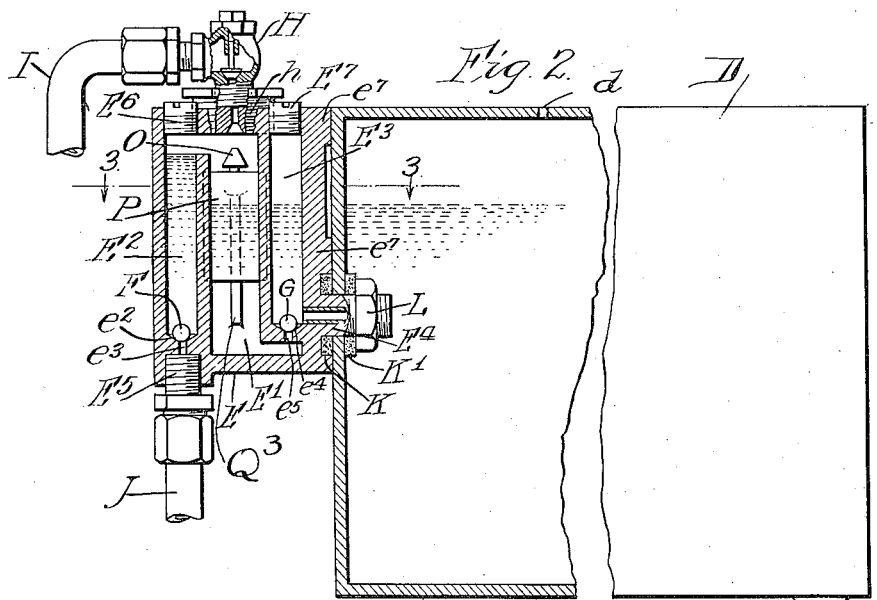
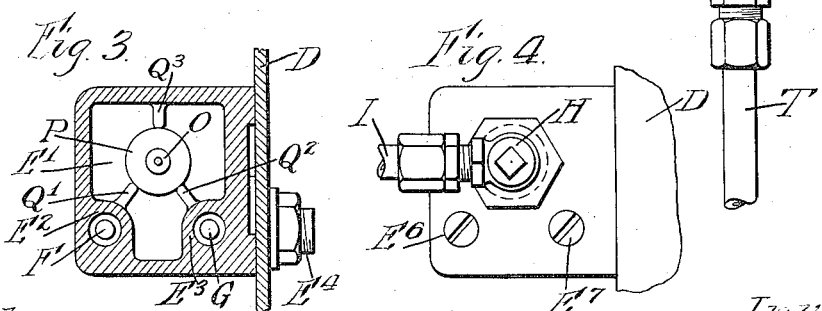

UNITED STATES PATENT OFFICE.

WEBB JAY, OF CHICAGO, ILLINOIS.

LIQUID-SUPPLY DEVICE.

1,132,943.  Specification of Letters Patent.  Patented Mar. 23, 1915.

Application filed June 26, 1914. Serial No. 847,420.

*To all whom it may concern:*

Be it known that I, WEBB JAY, a citizen of the United States, residing at Chicago, in the county of Cook and State of Illinois, have invented new and useful Improvements in Liquid-Supply Devices, of which the following is a specification, reference being had to the accompanying drawings, forming a part thereof.

The purpose of this invention is to provide an improved device by which the liquid fuel of an internal combustion engine on an automobile, or other motor-propelled vehicle, may be lifted from a low level main supply tank to a receptacle at a higher level suitable for feeding by gravity to the carbureter.

It consists in the elements and features of construction shown and described.

In the drawings: Figure 1 is a diagrammatic outline view of an automobile having its engine equipped with this invention, the general outlines of the automobile being shown in dotted lines and the features involving the invention shown in full line to indicate their position relative to the automobile engine parts. Fig. 2 is a vertical section through a portion of a receptacle which may be located under the seat of the vehicle and through a fitting thereon embodying the features of the invention. Fig. 3 is a section at the line 3—3 on Fig. 2. Fig. 4 is a plan view of the parts shown in Fig. 2.

The drawings show a device for the purpose stated adapted to be mounted upon the side of a relatively small receptacle which may be mounted under the seat of the automobile for supplying liquid fuel by gravity to the engine. The automobile, A, is shown in dotted outline; the engine, B, is similarly shown; C is the main fuel supply tank carried in the usual low position on the automobile frame; D is a supplemental fuel receptacle mounted under the seat, $A^1$. The receptacle, D, is provided with a small air vent at $d$ so that the liquid contents is exposed to atmospheric pressure. Upon the side of the receptacle, D, there is mounted a fitting, E. This fitting is preferably a casting in one piece suitably cored to comprise a chamber, $E^1$, and bosses, $E^2$ and $E^3$, extending vertically along the inner wall of the chamber, a horizontally-projecting nipple, $E^4$, projecting from one side near the lower end, and a short nipple, $E^5$, which projects from the bottom in line with the interior boss, $E^2$. The boss, $E^2$, terminates a little short of the upper end of the chamber, $E^1$, and the upper wall of the chamber has an aperture in line with the boss which is permanently closed by the lug, $E^6$, but through which the boss, $E^2$, may be bored from the upper end, being if preferred originally cored to render it hollow, the boring serving to finish it and to form a valve seat, $e^2$, at the lower end through which is bored a small aperture, $e^3$, leading into the cavity of the nipple, $E^5$, which is interiorly threaded for pipe connection. The boss, $E^3$, terminates a little short of the bottom of the chamber. This boss is cast hollow from the upper end down to a point opposite the nipple, $E^4$, and is finished by boring from the upper end nearly to the lower end, forming a valve seat, $e^4$, through which there is bored a small aperture, $e^5$, opening at the lower end of the boss for communication of its cavity with the chamber, $E^1$. The upper end of the cavity of the boss, $E^3$, is permanently closed by a plug, $E^7$. The nipple, $E^4$, is bored for communication through it with the cavity of the boss, $E^3$, said communication being made a little above the valve seat, $e^4$. Before inserting the plugs, $E^6$ and $E^7$, ball valves, F and G, are dropped into the cavities of the bosses, $E^2$ and $E^3$, respectively, to seat on the ball seats, $e^2$ and $e^4$, operating as check valves permitting upward movement into the cavities of said bosses and seating normally by gravity and being held seated by a downward flow. The top of the chamber, $E^1$, is tapped for a pipe connection and receives an angle check valve, H, for connecting a pipe line, I, with the chamber, $E^1$, the check valve opening upwardly for flow out from the chamber and seating normally by gravity and upon inward flow. A pipe line, J, is connected to the nipple, $E^5$. Around the nipple, $E^4$, there is formed a seat for a packing gasket, K.

The fitting, E, is mounted upon the side of the receptacle, D, by insertion of the nipple, $E^4$, through an aperture in the receptacle wall, additional means of attachment being provided, if desired, by lugs, $e^7$, through which properly packed bolts may take for clamping the fitting to the receptacle wall. A packing, $K^1$, is applied to the nipple inside the receptacle wall, and the securement of the fitting to the receptacle is completed by means of a nut, L, clamping the packings.

The angle check valve fitting, H, in addition to the usual seat for the valve which opens outwardly, is formed with a seat, $h$, at the lower inner end for upward seating of a valve, O, which is carried by a float, P, preferably cylindrical in form and guided vertically in the chamber, $E^1$, by three ribs, $Q^1$, $Q^2$ and $Q^3$, the ribs, $Q^1$ and $Q^2$, projecting from the sides of the bosses, $E^2$ and $E^3$, respectively, and the rib, $Q^3$, projecting from the wall of the chamber, the guiding edges of these ribs being positioned in a circle about the axis of the vertical limb of the check valve fitting, and the space defined between them having substantially the radius of the threaded aperture at which the check valve fitting is attached, so that the edges may be finished by boring and the float, P, of suitable diameter to be guided by them can be entered through the threaded opening.

The operation of this device is that when the fitting, E, is connected at the nipple, $E^5$, by a pipe line, J, with the main supply tank, C, and check valve, H, is connected by a pipe line, I, with a means of suction, as, for example, with an exhaust pump indicated at M, or with the manifold of the engine, so as to be exposed to the suction resulting from the intake stroke of the engine piston, a partial vacuum is produced in the chamber, $E^1$, which is increased at each engine pump stroke until it is sufficient to cause the liquid fuel to be lifted by atmospheric pressure on the main supply tank up into the chamber, $E^1$, of the fitting, E, coming in past the check valve, F, and pouring out from the top of the boss, $E^2$, and when it reaches a sufficient height in the chamber, $E^1$, to cause the float, P, to seat the valve, O. This seating will happen suddenly because when the valve nears its seat it will be subject to the suction operating through the pipe line, I, and will be pulled to its seat from some little distance away therefrom, so that in practice the inflow will continue in full force until it is interrupted by the instantaneous seating of the check valve, O, in the manner described. This valve being seated, the inflow of liquid fuel will soon cease because the suction will be cut off; and the plug $E^6$, being fitted loosely enough to allow slight air leakage into the chamber, $E^1$, the liquid will flow out past the check valve, G, through the nipple, $E^4$, into the receptacle, D, until the liquid level falls sufficiently in the chamber, $E^1$, of the fitting to leave the float, P, sufficiently unsupported so that it will be operated by its weight to pull the valve, O, off its seat against the suction tending to hold it thereon, whereupon suction being restored, this process will be repeated while the engine is running until the receptacle, D, is filled to the height at which the float, P, operates to seat the valve, O, and thereafter the valve, O, will be opened and suction admitted only as the liquid is withdrawn from the chamber, D, and falls in that chamber and in the chamber, E, to the level for opening the valve, O, by means of the float, P, as described.

The receptacle, D, is connected near the bottom by a pipe line, T, with the carbureter for supplying the latter by gravity.

It will be obvious that the combustibility or destination of the liquid whose movement is governed by the device described is not material, and it may be any liquid required in the service of the engine or the vehicle.

I claim:

1. A device for the purpose indicated, including a fitting comprising a chamber having a liquid inlet passage and a liquid outlet passage, the former leading upwardly into and the latter upwardly out of said chamber; check valves controlling said passages for flow inwardly through the inlet and outwardly through the outlet, and adapted to be seated by reverse flow; an exhaust connection at the top of said chamber and a check valve in said exhaust connection opening for outward flow, and adapted to be seated by inward flow.

2. A device for the purpose indicated, including a fitting comprising a chamber having a liquid inlet passage and a liquid outlet passage, the former leading upwardly for entrance to the chamber and the latter leading upwardly for discharge from the chamber; check valves controlling said passages by seating downwardly therein; an exhaust connection at the top of the chamber; a check valve therein opening for outlet and adapted to be seated by inflow; a float in said chamber and a valve carried by the float adapted to seat upwardly for closing the exhaust communication, said float being adapted when not buoyed by the contents of the liquid chamber to act as a weight for pulling said valve off its seat against any exhaust suction tending to hold it thereon.

3. A device for the purpose indicated, including an integral fitting comprising a chamber and having bosses projecting inwardly from the wall of said chamber, one extending up from the bottom stopping short of the top, and the other extending down from the top stopping short of the bottom, said fitting being formed with apertures in the top in line with said bosses for boring them out, said apertures being adapted to be permanently plugged, the bosses being bored through from their upper ends to form valve seats near their lower ends, and reduced ports through said seats to the lower ends of said bosses respectively, said fitting being adapted for connection with a pipe line at the lower end of the first mentioned boss, and having a lateral nipple leading into the cavity of the second boss above the valve seat therein, the chamber being provided with a pipe line connection at the top and a check valve in said connection opening for outflow therethrough.

4. A device for the purpose indicated, comprising a fitting having a chamber and two vertical bosses protruding inwardly from the wall of the chamber, one extending up from the bottom stopping short of the top, and the other extending down from the top stopping short of the bottom, both said bosses being bored from the top to form valve seats near the lower ends, and ports through said seats and check valves seating downwardly at said ports, the fitting having a nipple projecting laterally opposite the lower end of the second mentioned boss, and affording a discharge passage leading into the cavity of said boss above the valve seat therein, the top of the chamber having a threaded aperture for receiving a pipe line connection; the two vertical bosses and one wall of the chamber having each a vertical rib, said three ribs having their three edges concentric about the axis of said threaded aperture; a cylindrical float positioned between and guided by said three ribs; a valve body screwed into said aperture, said body having two valve seats, a check valve in the body seating upon one of said seats opening for out-flow and seating by inflow, and a valve carried by the float seating upwardly against the other seat.

5. A device for the purpose indicated, comprising a chamber having a liquid inlet and a liquid outlet, and check valves which control them respectively for inflow at the inlet and outflow at the outlet; an exhaust connection at the upper part of the chamber; a valve for closing said exhaust connection which moves for seating in the direction of the outflow through the exhaust and which is thereby adapted to be sucked onto its seat; a float in the chamber operatively connected to the last mentioned valve for moving the valve throughout substantially the entire range of movement of the float and seating the valve by rise and unseating it by fall of the float, the float being long vertically relatively to its area in horizontal section for extending the distance through which change of level of the liquid in the chamber is required for moving the valve to position to be seated by suction and for unseating the same against the suction.

In testimony whereof, I have hereunto set my hand at Chicago, Illinois, this 24th day of June, 1914.

WEBB JAY.

Witnesses:
   EDNA M. MACINTOSH,
   LUCY I. STONE.